United States Patent
Cangiano et al.

(10) Patent No.: US 8,328,931 B2
(45) Date of Patent: Dec. 11, 2012

(54) HYDRAULIC BINDER COMPRISING A GROUND BLAST FURNACE SLAG

(75) Inventors: Stefano Cangiano, Torre' de Roveri (IT); Antonio Princigallo, Stezzano (IT)

(73) Assignee: Italcementi S.p.A., Bergamo (IT)

( * ) Notice: Subject to any disclaimer, the term of this patent is extended or adjusted under 35 U.S.C. 154(b) by 0 days.

(21) Appl. No.: 13/512,494

(22) PCT Filed: Nov. 30, 2010

(86) PCT No.: PCT/EP2010/068465
§ 371 (c)(1),
(2), (4) Date: May 29, 2012

(87) PCT Pub. No.: WO2011/064378
PCT Pub. Date: Jun. 3, 2011

(65) Prior Publication Data
US 2012/0234209 A1    Sep. 20, 2012

(30) Foreign Application Priority Data

Nov. 30, 2009   (IT) .............................. MI2009A2105

(51) Int. Cl.
C04B 18/14     (2006.01)
C04B 28/08     (2006.01)
(52) U.S. Cl. ....................................... 106/714; 106/715
(58) Field of Classification Search .................. 106/714, 106/715
See application file for complete search history.

(56) References Cited

U.S. PATENT DOCUMENTS

| | | | | |
|---|---|---|---|---|
| 2,947,643 A | * | 8/1960 | Kamlet ......................... | 106/715 |
| 6,409,820 B1 | * | 6/2002 | Novak .......................... | 106/714 |
| 8,056,631 B2 | * | 11/2011 | Garcia et al. .................. | 166/293 |
| 8,257,488 B2 | * | 9/2012 | Garcia et al. .................. | 106/714 |
| 2011/0136946 A1 | * | 6/2011 | Kono et al. ....................... | 524/5 |
| 2011/0259246 A1 | * | 10/2011 | Guynn et al. .................. | 106/707 |

FOREIGN PATENT DOCUMENTS

| CA | 2324486 A1 | * | 4/2002 |
|---|---|---|---|
| EP | 2080742 A2 | * | 7/2009 |
| JP | 59-091190 A | * | 5/1984 |
| JP | 2007-217197 A | * | 8/2007 |
| JP | 2010-285292 A | * | 12/2010 |
| JP | 2010-285465 A | * | 12/2010 |
| WO | WO-2011/055063 A1 | * | 6/2011 |
| WO | WO-2011/064378 A1 | * | 6/2011 |

* cited by examiner

*Primary Examiner* — Anthony J Green
(74) *Attorney, Agent, or Firm* — Abelman, Frayne & Schwab

(57) ABSTRACT

The present invention concerns a hydraulic binder comprising a ground blast furnace slag in an amount comprised between 30% and 95% by mass on the binder, Portland cement clinker in an amount equal to or greater than 5% by mass on the binder, and at least one sulphate as activator, characterised in that said slag has the following properties and composition by mass: grinding fineness greater than 4000 cm2/g Blaine glass content greater than 80% $SiO_2$: 30-40% $Al_2O_3$: 9-13% CaO: 34-42% with a $(CaO+MgO)/(Al_2O_3+SiO_2)$ ratio greater than 1; and in that said sulphate is contained in a total amount, expressed as $SO_3$, comprised between 0.6% and 4.5% by mass on the binder.

16 Claims, No Drawings

HYDRAULIC BINDER COMPRISING A GROUND BLAST FURNACE SLAG

The subject application is a National Phase of PCT/EP2010/068465 filed 30 Nov. 2010 which claims priority from Italian Application IT No. MI2009A002105 filed on 30 Nov. 2009, which is incorporated by reference.

FIELD OF THE INVENTION

The present invention relates to hydraulic binders, such as cements, which use a finely ground and activated granulated blast furnace slag of latent hydraulic activity.

STATE OF THE ART

Ground blast furnace slag is a by-product of cast iron production starting from iron minerals or scrap. In this process a liquid slag forms and floats on the molten metal, the slag containing lime, silica and other oxides such as MgO, which separate from the metal at temperatures exceeding 1900° C. This by-product is suddenly cooled to obtain a vitreous granulate with latent hydraulic properties.

The use of granulated blast furnace slag is permitted as a cement component by European Standard EN 197-1, type II (Portland slag cement) and III (blast furnace cement), up to a theoretical slag content of 95%. This high value is related to the potential hydraulicity of slag and its activability in cementitious mixtures which enable concretes to be produced for particular applications, for instance where high durability is required with low heat development or with low atmospheric $CO_2$ emissions.

Specifically, EN 197-1 requires the following conditions to be satisfied: $(CaO+MgO)/SiO_2>1$; $CaO+MgO+SiO_2>67\%$ and vitreous mass greater than 67%.

Slag activation requires the addition of an activator chosen from alkalis, or sulphates, or calcium oxide, or chloride ion based alkaline salts, or it can also be implemented thermally. The ability to replace a Portland cement clinker with slag increases with the level of slag activation.

In general however the reactivity of cements of high slag content is considered to be too mild compared with cements of high clinker content; the high slag content is aimed at those applications in which the typical high activity of clinker would lead to excessive overheating of the final concrete article.

The availability of cements of high slag content with good mechanical characteristics would be desirable, in particular good compressive strength with quick curing. This property would also extend the application of high slag content cements to those sectors in which cements of high clinker content are currently used, as well as to structural applications in aggressive environments, or to road, railway or airport construction, or for large castings, or for castings in coastal localities.

In the known art, U.S. Pat. No. 6,409,820 describes a hydraulic binder comprising a slag, activatable with sulphates, and having a glass content or vitreous fraction greater than 93%, $SiO_2=34-40\%$, $Al_2O_3>9\%$, $CaO=34-37\%$ by mass, and a $(CaO+MgO)/(Al_2O_3+SiO_2)$ ratio=0.88-0.98, hence less than 1, and a high content of sulphates, with $CaSO_4$ variable between 12 and 20% by mass on the binder, as activators.

U.S. Pat. No. 6,409,820 shows in its experimental part that a similar slag composition in which however the components are only slightly varied such that the $(CaO+MgO)/(Al_2O_3+SiO_2)$ ratio=1.03, hence greater than 1, is not suitable for is forming a hydraulic binder of low clinker content that provides satisfactory final article properties, in particular compressive strength.

SUMMARY OF THE INVENTION

An object of the present invention is to provide a hydraulic binder of medium and high slag content instead of clinker in compliance with standard EN 197-1, in which Portland cement clinker is contained in a quantity equal to or greater than 5% by mass on the binder, which is able to form concrete articles of high mechanical performance with quick curing and of low environmental impact due to its moderate $CO_2$ content.

A particular object of the present invention is to achieve said result while satisfying the requirements of standard EN 197-1, in particular for rapid hardening (R) strength classes.

An object of the present invention is also to provide this binder while maintaining the content of slag activators substantially low, within the limits allowed by standard EN 197-1 because if said content is high, various technical problems can arise as a result. In this respect, it is considered that, for example, the use of high amounts of alkali results in greater shrinkage with consequent increased risks of crack formation in concrete applications, greater undesirable reactivity towards aggregates, especially due to alkali-silica reaction, and the appearance of efflorescence in concrete. With regard to the use of large amounts of chloride ion based alkaline salts, this is considered to increase corrosion risks in reinforced concrete structures. With regard to the use of large amounts of sulphates, this is thought to lead to delayed expansion phenomena in the cured concrete article with possible disgregation of the article, or to detachment of structural parts.

A further object of the invention is to provide a high activity slag which can be used in Portland cement clinker or as an addition to the concrete.

DETAILED DESCRIPTION OF THE INVENTION

This object is attained according to the present invention by a hydraulic binder comprising a ground blast furnace slag in a quantity between 30% and 95% by mass on the binder, Portland cement clinker in a quantity equal to or greater than 5% by mass on the binder and at least one sulphate as activator, characterised in that said slag has the following properties and composition by mass: grinding is fineness greater than 4000 cm$^2$/g Blaine, glass content greater than 80%, $SiO_2$ from 30 to 40%, $Al_2O_3$ from 9 to 13%, CaO from 34 to 42%, with a $(CaO+MgO)/(Al_2O_3+SiO_2)$ ratio greater than 1; and that said sulphate is contained in a total quantity, expressed as $SO_3$, of between 0.6 and 4.5% by mass on the binder.

Preferably, said slag has a MgO content greater than 8% by mass.

Said sulphate is chosen as one or more of the following: $CaSO_4$, $Na_2SO_4$, $K_2SO_4$. When the sulphate is $CaSO_4$, it is either natural or is a product obtained by desulphurization processes, or is a mixture of the preceding, or is in the form of hydrated salt (hemihydrate).

The quantity of said activator in the binder is hence preferably chosen as follows: $CaSO_4$ in the range between 0.3-5%, preferably 0.5-2.5%, by mass on the hydraulic binder; $Na_2SO_4$ in the range between 0.3-5%, preferably 0.5-2.5%, by mass on the hydraulic binder.

In one embodiment, said activator can comprise calcium oxide, present in the range between 0.3-5%, preferably 1-4%, by mass on the hydraulic binder.

In one embodiment, said slag in said hydraulic binder is ground to a fineness greater than 5000 cm²/g, while in a different preferred embodiment, it is ground to a fineness greater than 6000 cm²/g Blaine.

For the purposes of the present description, cementitious compositions mean cementitious mixes comprising at least said hydraulic binder, water and possibly one or more inert aggregates, and/or one or more mineral additions, and/or fibres for cements, and/or one or more conventional additives.

The term "hydraulic binder" means a material in powder form in the dry state which, when mixed with water, provides plastic mixtures able to solidify and harden with time. Cements mean in particular those included in European Standard EN 197-1.

Cementitious compositions are divided into pastes, i.e. compositions without inert aggregates, and conglomerates, i.e. compositions containing at least one inert aggregate. Conglomerates are divided into mortars (containing fine aggregates such as sand), and concretes (containing both fine aggregates and coarse aggregates such as gravel, pebbles and crushed stone, chosen for example from is those classified according to UNI EN 12620).

The present invention is particularly suitable for mortars and concretes.

A mineral addition means any type of finely divided inorganic material which can be added to the concrete to impart ideal mechanical strength and durability characteristics. The additions can be inert, pozzolanic or of latent hydraulic activity, these additions being for example chosen from those allowed by European Standard EN 206-1.

More particularly, the term "addition" means a finely divided activated ground slag. The slag based hydraulic binders of the present invention, when used as cements, give rise to the production of concretes in accordance with European Standard EN 206-1.

The quantities of these binders, per cubic metre of concrete, fall within the range of values commonly adopted for concretes while respecting the limiting values recommended for concrete composition and properties (EN 206-1). A concrete can be produced having a binder quantity greater than 100 kg/m³.

Even when the activated slag of the present invention is used as a concrete addition, a concrete can be produced conforming to European Standard EN 206 having an addition quantity greater than 10 kg/m³.

The characteristics and advantages of the present invention are described in greater detail in the following examples, given merely as non-limiting illustration of the present invention.

EXAMPLES

In the following examples 1, 2, 3, 4 and 5, three slags for hydraulic binders according to the present invention are identified as GGBFS1, GGBFS5 and GGBFS6, having the composition stated in the following Table 1.

Example 6 shows the results for applications in concrete.

Table 1 also shows for comparison purposes the compositions of slags not suitable for the present invention, namely: GGBFS2, GGBFS3 and GGBFS4, this latter corresponding to the aforesaid comparison slag of the known art described in U.S. Pat. No. 6,409,820.

In the described examples, hydraulic binders according to the present invention are used as cements. Cements according to the invention and comparison is cements were prepared as follows:

1. Drying and grinding a slag in accordance with the following Table 1;
2. Grinding of
   Portland cement clinker (according to EN 197-1)
   calcium sulphate
   possible minor components for clinker production, such as organic components in a total quantity not exceeding 0.5% by mass on the binder.

This ground Portland cement clinker with calcium sulphate and possible minor components is also a CEM I 52.5 R cement according to European Standard EN 197-1. Said possible minor components according to European Standard EN 197-1 are different from slag and clinker and are contained in a quantity less than 5% by mass on the sum of the clinker and slag quantities according to CEM I 52.5R.

3. Dry mixing the slag of 1), the Portland cement clinker of 2) and the activators.

TABLE I

| Slag components | GGBFS1 | GGBFS2 | GGBFS3 | GGBFS4 | GGBFS5 | GGBFS6 |
|---|---|---|---|---|---|---|
| glass content (vitreous fraction) | 95% | 85% | 90% | 94% | 85% | 95% |
| $SiO_2$ | 35.24% | 37.76% | 38.05% | 37.3% | 35.95% | 36.7% |
| $Al_2O_3$ | 12.01% | 10.44% | 6.49% | 10% | 10.5% | 10.2% |
| CaO | 40.41% | 39.31% | 39.65% | 38.2% | 40.85% | 37.15% |
| MgO | 8.47% | 7.71% | 4.22% | 10.5% | 8.51% | 10.8% |
| $(CaO + MgO)/(Al_2O_3 + SiO_2)$ ratio | 1.03 | 0.98 | 0.99 | 1.03 | 1.06 | 1.02 |

Example 1

A cement was prepared having the following composition:
94% activated slag GGBFS1 of Table 1
5.6% Portland cement clinker
0.4% minor components
with a sulphate content expressed as $SO_3$ equal to 4.2% by mass on the cement, in which the activated slag consisted of:
3% CaO
5% $CaSO_4$
92% slag ground to a Blaine fineness of 5800 cm²/g.

The following compressive strength results, Rc, were obtained:
Rc after 2 days=14.0 MPa
Rc after 7 days=31.6 MPa
Rc after 28 days=44.7 MPa
conforming to a CEM III/C 32.5R or CEM III/C 42.5N.

Example 2

A cement was prepared having the following composition:
94% activated slag GGBFS1 of Table 1
5.6% Portland cement clinker
0.4% minor components with a sulphate content expressed as $SO_3$ equal to 4.1% by mass on the cement, in which the activated slag consisted of:
- 4.0% CaO
- 3.0% $CaSO_4$
- 2.0% $Na_2SO_4$
- 91.0% slag ground to a Blaine fineness of 5800 $cm^2/g$.

The following compressive strength results, Rc, were obtained:
Rc after 2 days=17.0 MPa
Rc after 7 days=31.1 MPa
Rc after 28 days=38.1 MPa
conforming to a CEM III/C 32.5R.

Example 3

A cement was prepared having the following composition:
- 90% activated slag GGBFS1 of Table 1
- 9.3% Portland cement clinker
- 0.7% minor components with a sulphate content expressed as $SO_3$ equal to 4.3% by mass on the cement, is in which the activated slag consisted of:
- 4.0% CaO
- 3.0% $CaSO_4$
- 2.5% $Na_2SO_4$
- 90.5% slag ground to a Blaine fineness of 6200 $cm^2/g$.

The following compressive strength results, Rc, were obtained:
Rc after 2 days=22.2 MPa
Rc after 7 days=35.3 MPa
Rc after 28 days=45.6 MPa
conforming to a CEM III/C 42.5R or CEM III/C 42.5N or CEM III/C 32.5R.

Example 4

A cement was prepared having the following composition:
- 94% activated slag GGBFS5 of Table 1
- 5.6% Portland cement clinker
- 0.4% minor components with a sulphate content expressed as $SO_3$ equal to 4.4% by mass on the cement, in which the activated slag consisted of:
- 5.0% CaO
- 5.0% $CaSO_4$
- 90% slag ground to a Blaine fineness of 5800 $cm^2/g$.

The following compressive strength results, Rc, were obtained:
Rc after 2 days=13.7 MPa
Rc after 7 days=34.2 MPa
Rc after 28 days=50.4 MPa
conforming to a CEM III/C 42.5N.

Example 5

Table II shows the compressive strengths after 2 days (EN 196-1), i.e. $Rc_{2days}$ measured in MPa for two cements of the present invention ($I_1$, $I_2$) compared to cements not pertaining to the invention ($C_1$, $C_2$, $C_3$, $C_4$, $C_5$), these cements being obtained from the slags GGBFS1, GGBFS2, GGBFS3, GGBFS5 as identified in Table I above. The grinding fineness values (Blaine $cm^2/g$) are given next to each slag.

As can be deduced from the combined data of Table II, the cements $C_1$, $C_2$, $C_3$, $C_4$ and $C_5$ do not pertain to the present invention because of the chemical composition of the slag ($C_2$ $C_3$) or the activator content ($C_1$ $C_4$) or the slag fineness ($C_3$) or the slag content ($C_5$).

The marked increase in the compressive strength of the cements of the present invention ($I_1$ and $I_2$) after 2 days i.e. $Rc_{2days}$, compared to the cements $C_1$, $C_2$, $C_3$, $C_4$ and $C_5$, is therefore apparent.

For the activators of the GGBFS1 slag in cement $I_1$ of the present invention, also apparent was the effect of increasing compressive strength after 2 days with respect to the non-activated cement mixture $C_5$.

Moreover, the cements produced according to the present invention did not generally show expansion phenomena in stability tests, and their 'start of setting' times were found to be greater than those of the reference cements as shown in Table III below, from which it can be concluded that mortar rheology was normal.

TABLE II

Properties and compositions of cements obtained from the slags of Table I

| Slag | activators (% on the slag) | activated slag (% on the cement) | $Rc_{2\ days}$ EN 196-1 [MPa] | Cement I = invention C = comparison |
|---|---|---|---|---|
| GGBFS1 4700 $cm^2/g$ $(CaO + MgO)/(Al_2O_3 + SiO_2) = 1.03$ | none | 94 | 4.1 | $C_1$ |
| GGBFS2 7500 $cm^2/g$ $(CaO + MgO)/(Al_2O_3 + SiO_2) = 0.98$ | 5% CaO 3.5% $CaSO_4$ 2.5% $Na_2SO_4$ | 94 | 4.62 | $C_2$ |
| GGBFS3 3300 $cm^2/g$ $(CaO + MgO)/(Al_2O_3 + SiO_2) = 0.99$ | 5% CaO 3.5% $CaSO_4$ 2.5% $Na_2SO_4$ | 90 | 0.7 | $C_3$ |
| GGBFS1 6000 $cm^2/g$ $(CaO + MgO)/(Al_2O_3 + SiO_2) = 1.03$ | 1.5% CaO 5.1% $CaSO_4$ 1% $Na_2SO_4$ | 97.5 | 5.2 | $C_5$ |
| GGBFS1 6200 $cm^2/g$ $(CaO + MgO)/(Al_2O_3 + SiO_2) = 1.03$ | 4% CaO 3% $CaSO_4$ 2.5% $Na_2SO_4$ | 90 | 22.2 | $I_1$ |
| GGBFS4 5800 $cm^2/g$ $(CaO + MgO)/(Al_2O_3 + SiO_2) = 1.03$ | 3% CaO 13% $CaSO_4$ 0.5% Ca acetate | 85 | 7.0 | $C_4$ |
| GGBFS5 5800 $cm^2/g$ $(CaO + MgO)/(Al_2O_3 + SiO_2) = 1.06$ | 5% CaO 5% $CaSO_4$ | 94 | 13.7 | $I_2$ |

TABLE III

| | | | | | | | | Mortar |
| Starting material | activated slag [% on the cement] | CaO [% on the slag] | CaSO$_4$ [% on the slag] | Na$_2$SO$_4$ [% on the slag] | Stability [mm] | Consistency EN196 | Start of setting [min] | consistency [%] UNI 7044 |
|---|---|---|---|---|---|---|---|---|
| GGBFS6 7200 cm$^2$/g | 94 | 5.0 | 3.5 | 2.5 | 0 | 27.0 | 376 | 103 |
| GGBFS6 7200 cm$^2$/g | 70 | 5.0 | 5.0 | — | 0 | 27.6 | 250 | 98 |
| CEM I 52.5R | — | — | — | — | 0 | 30.2 | 173 | 82 |
| CEM II/A-LL 42.5R | — | — | — | — | 0 | 26.8 | 210 | 106 |

Example 6

Cements of the invention were used to produce concrete.

The results of the experiments carried out are given in Table IV.

A concrete produced with a limestone cement CEM II/A-LL 42.5R was used as the reference.

It can be seen that the blast furnace cement of the invention enabled the rheological and mechanical characteristics to be in line with those obtained with limestone cement in relation to the relative cement strength classes.

In particular the cement produced with the CEM III/B 52.5N enabled better mechanical characteristics than the reference concrete to be achieved. In this latter case to obtain the consistency class S5 a higher a/c ratio had to be adopted (i.e. 0.41 instead of 0.39).

TABLE IV

| | Cement | | | |
|---|---|---|---|---|
| | CEM III/C 32.5R | CEM III/C 42.5N | CEM II/ALL 42.5R | CEM III/B 52.5 N |
| Cement quantity [kg/m$^3$] | 420 | 420 | 420 | 416 |
| a/c | 0.39 | 0.39 | 0.39 | 0.41 |
| Consistency class | S5 | S5 | S4 | S5 |
| Rc 1 day [MPa] | 24 | 31 | 32 | 38 |
| Rc 2 days [MPa] | 39 | 46 | 42 | 48 |
| Rc 7 days [MPa] | 52 | 59 | 57 | 65 |
| Rc 28 days [MPa] | 58 | 66 | 65 | 75 |
| Rc 60 days [MPa] | 63 | 69 | 69 | 83 |

As is apparent from the preceding overall description, the invention therefore enables all the predetermined objects be effectively attained.

The invention claimed is:

1. Hydraulic binder comprising a ground blast furnace slag in an amount comprised between 30% and 95% by mass on the binder, Portland cement clinker in an amount equal to or greater than 5% by mass on the binder, and at least one sulphate as activator, characterized in that said slag has the following proprieties and composition by mass:
   grinding fineness greater than 4000 cm2/g Blaine;
   glass content greater than 80%
   SiO$_2$: 30-40%
   Al$_2$O$_3$: 9-13%
   CaO: 34-42%
   with a (CaO+MgO)/Al$_2$O$_3$+SiO$_2$) ratio greater than 1;
   and in that said sulphate is contained in a total amount, expressed as SO$_3$,
   comprised between 0.6% and 4.5% by mass on the binder.

2. Hydraulic binder according to claim 1, characterized in that said slag has a MgO content greater than 8% by mass.

3. Hydraulic binder according to claim 1, characterized in that said sulphate is chosen as one or more of the following compounds: CaSO$_4$, Na$_2$SO$_4$, K$_2$SO$_4$.

4. Hydraulic binder according to claim 1, characterized by comprising calcium oxide as activator.

5. Hydraulic binder according to claim 4, characterized by comprising as activator calcium oxide in the range between 0.3-5%, CaSO$_4$ in the range between 0.3-5% and Na$_2$SO$_4$ in the range between 0.3-5% by weight on the binder.

6. Hydraulic binder according to claim 1, characterized by comprising one or more organic components in a total amount not greater than 0.5% by weight on the binder.

7. Hydraulic binder according to claim 1, characterized in that said slag is ground to a fineness greater than 6000 cm$^2$/g Blaine.

8. Hydraulic binder according to claim 3, characterized in that said sulphate is CaSO$_4$, either natural or produced by desulphuration processes, or a mixture of them.

9. Concrete produced with a hydraulic binder according to claim 1.

10. A method for forming a hydraulic binder with a low content of Portland cement clinker and high compressive strength with quick curing, characterized in that a ground blast furnace slag having the following properties and composition by mass:
   grinding fineness greater than 4000 cm$^2$/g Blaine
   glass content greater than 80%
   SiO$_2$: 30-40%
   Al$_2$O$_3$: 9-13%
   CaO: 34-42%
   with a (CaO+MgO)/(Al$_2$O$_3$+SiO$_2$) ratio greater than 1;
   is mixed in an amount comprised between 30% and 95% by mass on the binder with Portland cement clinker in an amount equal to or greater than 5% by mass on the binder, the binder comprising at least one sulphate as activator contained in a total amount, expressed as SO$_3$, comprised between 0.6% and 4.5% by mass on the binder.

11. Method according to claim 10, characterized in that said slag has a MgO content greater than 8% by mass.

12. Method according to claim 10, characterized in that said sulphate is chosen as one or more of the following compounds: CaSO$_4$, Na$_2$SO$_4$, K$_2$SO$_4$.

13. Method according to claim 10, characterized in that said binder comprises calcium oxide as activator.

14. Method according to claim 13, characterized in that said binder comprises as activator calcium oxide in the range between 0.3-5%, CaSO$_4$ in the range between 0.3-5% and Na$_2$SO$_4$ in the range between 0.3-5% by weight on the binder.

15. Method according to claim 10, characterized in that said binder comprises one or more organic components in a total amount not greater than 0.5% by mass on the binder.

16. Method according to claim 10, characterized in that said slag is ground to a fineness greater than 6000 cm$^2$/g Blaine.

* * * * *